US 11,489,633 B2

(12) United States Patent
Sarkis et al.

(10) Patent No.: US 11,489,633 B2
(45) Date of Patent: Nov. 1, 2022

(54) HYBRID AUTOMATIC REPEAT REQUEST BUFFER MANAGEMENT

(71) Applicant: QUALCOMM Incorporated, San Diego, CA (US)

(72) Inventors: Gabi Sarkis, San Diego, CA (US); Kapil Gulati, Hillsborough, NJ (US); Tien Viet Nguyen, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 16/993,068

(22) Filed: Aug. 13, 2020

(65) Prior Publication Data
US 2021/0067281 A1 Mar. 4, 2021

Related U.S. Application Data

(60) Provisional application No. 62/891,884, filed on Aug. 26, 2019.

(51) Int. Cl.
*H04L 1/18* (2006.01)
*H04W 72/04* (2009.01)
(Continued)

(52) U.S. Cl.
CPC .......... *H04L 1/1819* (2013.01); *H04L 1/1835* (2013.01); *H04L 1/1854* (2013.01);
(Continued)

(58) Field of Classification Search
CPC ... H04L 1/1819; H04L 1/1835; H04L 1/1854; H04L 5/0055; H04L 1/1887;
(Continued)

(56) References Cited

U.S. PATENT DOCUMENTS

2013/0242729 A1 * 9/2013 Chen .............. H04L 1/0051
370/230
2014/0250343 A1 * 9/2014 Mueller-Weinfurtner ..........
H04L 1/1822
714/748
(Continued)

FOREIGN PATENT DOCUMENTS

WO WO-2017172452 A1 * 10/2017 .......... H04W 52/346

OTHER PUBLICATIONS

Ericsson: "Discussion on UE Decoding Capabilities", 3GPP Draft, 3GPP TSG RAN WG1 Meeting #88, R1-1703036 Ericsson—Discussion on UE decoding capabilities, 3rd Generation Partnership Project (3GPP), Mobile Competence Centre, 650, Route Des Lucioles, F-06921 Sophia-Antipolis Cedex, vol. RAN WG1, No. Athens, Greece, Feb. 13, 2017-Feb. 17, 2017, Feb. 12, 2017 (Feb. 12, 2017), XP051210176, 2 Pages, Retrieved from the Internet: URL: http://www.3gpp.org/ftp/Meetings_3GPP_SYNC/RAN1/Docs/, [retrieved on Feb. 12, 2017], p. 1, Agreements p. 2, last three paragraphs p. 3, section 3, section 4.
(Continued)

*Primary Examiner* — Rina C Pancholi
(74) *Attorney, Agent, or Firm* — Patterson + Sheridan, L.L.P.

(57) ABSTRACT

Certain aspects of the present disclosure provide techniques for managing a hybrid automatic repeat request (HARQ) buffer. An example method that may be performed by a first user equipment (UE) includes dropping, in response to a HARQ budget that is exceeded relative to a number of active HARQ processes, according to one or more rules, at least one of the transmissions or one or more transport blocks (TBs) associated with the at least one of the transmissions from being processed. The method further includes processing the remaining transmissions and taking one or more actions based on the processed remaining transmissions.

40 Claims, 8 Drawing Sheets

(51) Int. Cl.
*H04L 5/00* (2006.01)
*H04W 92/18* (2009.01)

(52) U.S. Cl.
CPC ......... *H04L 5/0055* (2013.01); *H04W 72/048* (2013.01); *H04W 72/0446* (2013.01); *H04W 92/18* (2013.01)

(58) Field of Classification Search
CPC ............ H04L 1/1822; H04W 72/0446; H04W 72/048; H04W 92/18; H04W 36/03; H04W 76/14; H04W 84/005
See application file for complete search history.

(56) References Cited

U.S. PATENT DOCUMENTS

2017/0207885 A1\* 7/2017 Lee ....................... H04L 1/1835
2021/0067279 A1 3/2021 Sarkis et al.

OTHER PUBLICATIONS

Intel Corporation: "Design of Physical Layer Procedures for NR V2X Sidelink Communication", 3GPP Draft, 3GPP TSG RAN WG1 RAN1#96bis, R1-1904299, 3rd Generation Partnership Project (3GPP), Mobile Competence Centre, 650, Route Des Lucioles, F-06921 Sophia-Antipolis Cedex, France, Apr. 12, 2019 (Apr. 12, 2019), pp. 1-11, XP051707178, p. 1, Introduction p. 5, section 2.4 p. 6, section 2.5.
International Search Report and Written Opinion—PCT/US2020/046417—ISAEPO—dated Nov. 30, 2020.
Samsung: "On TBS and Soft Buffer Size", 3GPP Draft; 3GPP TSG RAN WG1 #88, R1-1703463 TB Size, 3rd Generation Partnership Project (3GPP), Mobile Competence Centre; 650, Route Des Lucioles; F-06921 Sophia Antipolis Cedex; France, vol. RAN WG1, No. Athens, Greece; Feb. 13, 2017-Feb. 17, 2017, Feb. 16, 2017 (Feb. 16, 2017), pp. 1-3, XP051236512, Retrieved from the Internet: URL: http://www.3gpp.org/ftp/tsg_ran/WG1_RL1/TSGR1_88/Docs/ [retrieved on Feb. 16, 2017].

\* cited by examiner

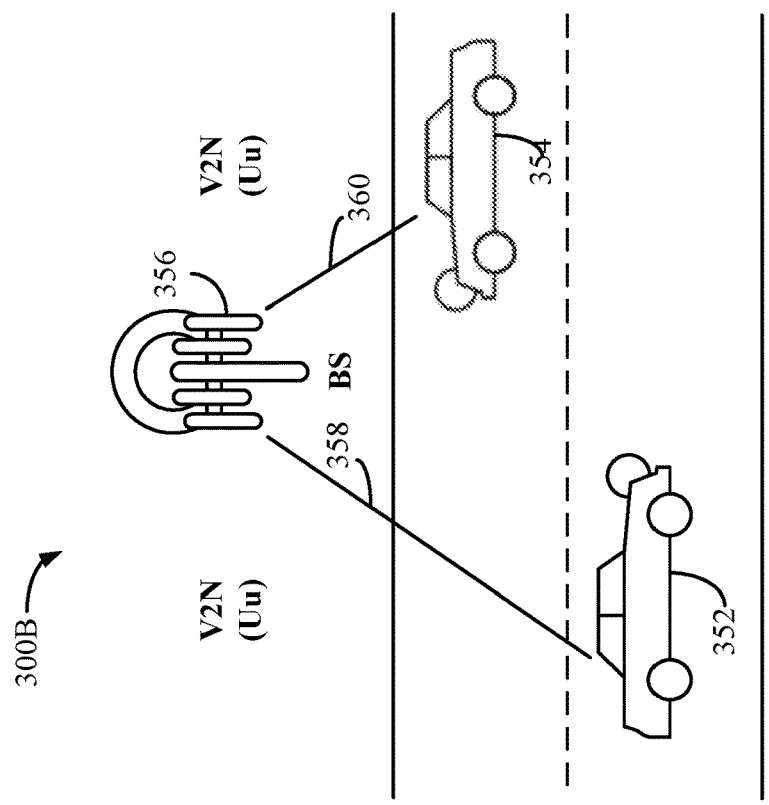
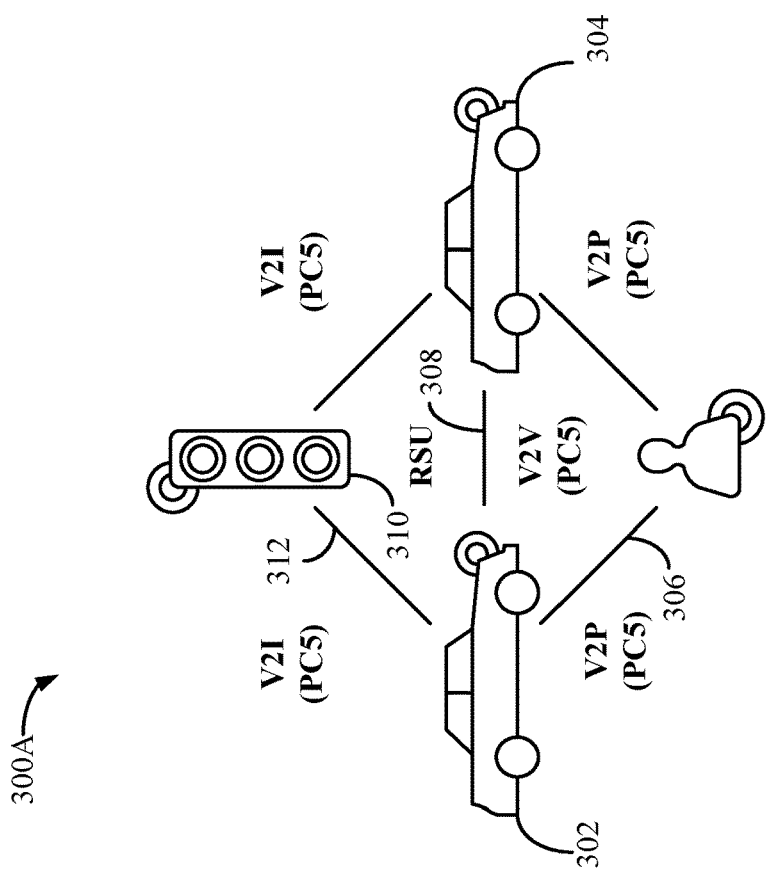
FIG. 3B
FIG. 3A

HYBRID AUTOMATIC REPEAT REQUEST BUFFER MANAGEMENT

CROSS-REFERENCE TO RELATED APPLICATION

The present Application for Patent claims priority to U.S. Provisional Application No. 62/891,884, filed Aug. 26, 2019, which is assigned to the assignee of the present application and hereby expressly incorporated by reference herein in its entirety.

INTRODUCTION

Aspects of the present disclosure relate to wireless communications, and more particularly, to techniques for managing a hybrid automatic repeat request (HARQ) buffer.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include management of a hybrid automatic repeat request (HARQ) buffer, which may provide desirable HARQ operations and/or desirable sidelink communications.

Certain aspects provide a method for wireless communication by a first user equipment (UE). The method generally includes dropping, in response to a HARQ budget that is exceeded relative to a number of active HARQ processes, according to one or more rules, at least one of the transmissions or one or more transport blocks (TBs) associated with the at least one of the transmissions from being processed. The method further includes processing the remaining transmissions and taking one or more actions based on the processed remaining transmissions.

Certain aspects provide a method for wireless communication by a first user equipment (UE). The method generally includes dropping, in response to a HARQ budget that is exceeded relative to a number of active HARQ processes, according to one or more rules, at least one of the transmissions or one or more TBs associated with the at least one of the transmissions from being transmitted. The method also includes transmitting the remaining transmissions to the one or more second UEs.

Certain aspects provide an apparatus for wireless communication. The apparatus generally includes a memory and a processor coupled to the memory. The processor and the memory are configured to drop, in response to a HARQ budget that is exceeded relative to a number of active HARQ processes, according to one or more rules, at least one of the transmissions or one or more TBs associated with the at least one of the transmissions from being processed, process the remaining transmissions, and take one or more actions based on the processed remaining transmissions.

Certain aspects provide an apparatus for wireless communication. The apparatus generally includes a memory and a processor coupled to the memory. The processor and the memory are configured to drop, in response to a HARQ budget that is exceeded relative to a number of active HARQ processes, according to one or more rules, at least one of the transmissions or one or more TBs associated with the at least one of the transmissions from being processed. The apparatus further includes a transmitter configured to transmit the remaining transmissions to the one or more UEs.

Certain aspects provide an apparatus for wireless communication. The apparatus generally includes means for dropping, in response to a HARQ budget that is exceeded relative to a number of active HARQ processes, according to one or more rules, at least one of the transmissions or one or more TBs associated with the at least one of the transmissions from being processed; means for processing the remaining transmissions; and means for taking one or more actions based on the processed remaining transmissions.

Certain aspects provide an apparatus for wireless communication. The apparatus generally includes dropping, in response to a HARQ budget that is exceeded relative to a number of active HARQ processes, according to one or more rules, at least one of the transmissions or one or more TBs associated with the at least one of the transmissions from being transmitted; and transmitting the remaining transmissions to the one or more second UEs.

Certain aspects provide a computer readable medium having instructions stored thereon for dropping, in response to a HARQ budget that is exceeded relative to a number of active HARQ processes, according to one or more rules, at least one of the transmissions or one or more TBs associated with the at least one of the transmissions from being processed; processing the remaining transmissions; and taking one or more actions based on the processed remaining transmissions.

Certain aspects provide a computer readable medium having instructions stored thereon for dropping, in response to a hybrid automatic repeat request (HARQ) budget that is exceeded relative to a number of active HARQ processes, according to one or more rules, at least one of the transmissions or one or more transport blocks (TBs) associated with the at least one of the transmissions from being transmitted; and transmitting the remaining transmissions to the one or more second UEs.

Certain aspects provide a method for wireless communication by a first user equipment (UE). The method generally includes determining a hybrid automatic repeat request (HARQ) budget is exceeded based on transmissions received from one or more second UEs and dropping, based on the determination, according to one or more rules at least one of the transmissions or one or more transport blocks (TBs) associated with the at least one of the transmissions from being processed. The method further includes processing the remaining transmissions and taking one or more actions based on the processed remaining transmissions.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 3A, 3B, and 4 illustrate vehicle to everything (V2X) systems, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for managing a HARQ budget. In certain wireless communications, HARQ re-transmissions may be supported in sidelink communications. Without a centralized scheduler, sidelink transmissions may easily overload the processing capacity of UE to perform HARQ operations on all received transmissions. Aspects of the present disclosure provide mechanisms for choosing which transmissions are dropped when the HARQ budget (e.g., a soft-buffer limitation or processing capacity) is exceeded. The HARQ buffer management described herein may provide desirable HARQ operations and/or desirable sidelink communications.

The following description provides examples of HARQ budget management in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
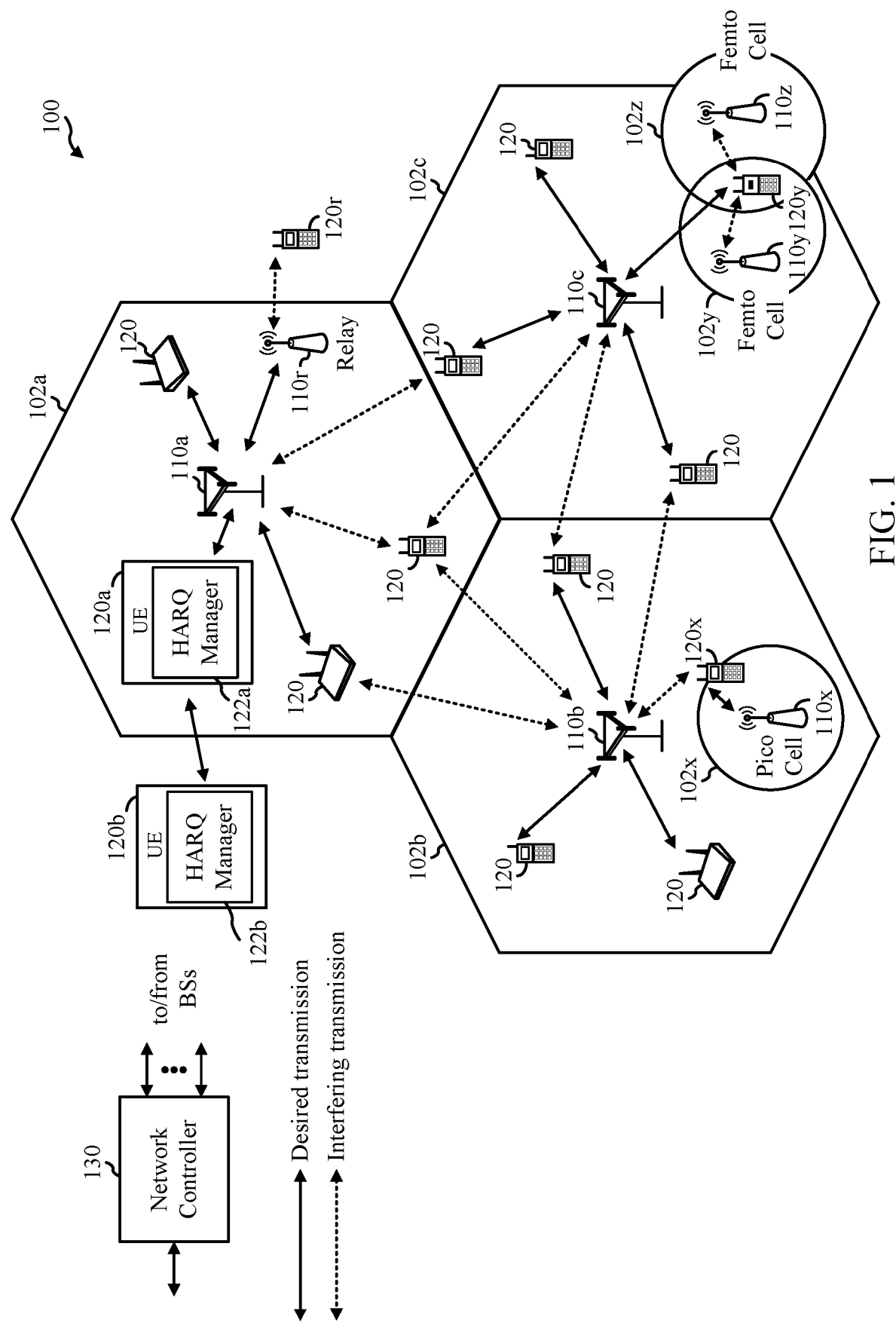
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network). As shown in FIG. 1, the UEs 120a, 120b include a HARQ manager 122a, 122b, respectively, that determines which transmissions or transport blocks to drop from HARQ operations based on various rules to avoid exceeding a HARQ budget as further described herein.

NR access (e.g., 5G NR) may support various wireless communication services, such as enhanced mobile broadband (eMBB) targeting wide bandwidth (e.g., 80 MHz or beyond), millimeter wave (mmWave) targeting high carrier frequency (e.g., 25 GHz or beyond), massive machine type communications MTC (mMTC) targeting non-backward compatible MTC techniques, and/or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (e.g., a slot or subframe) and/or frequency-domain resource (e.g., component carrier).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
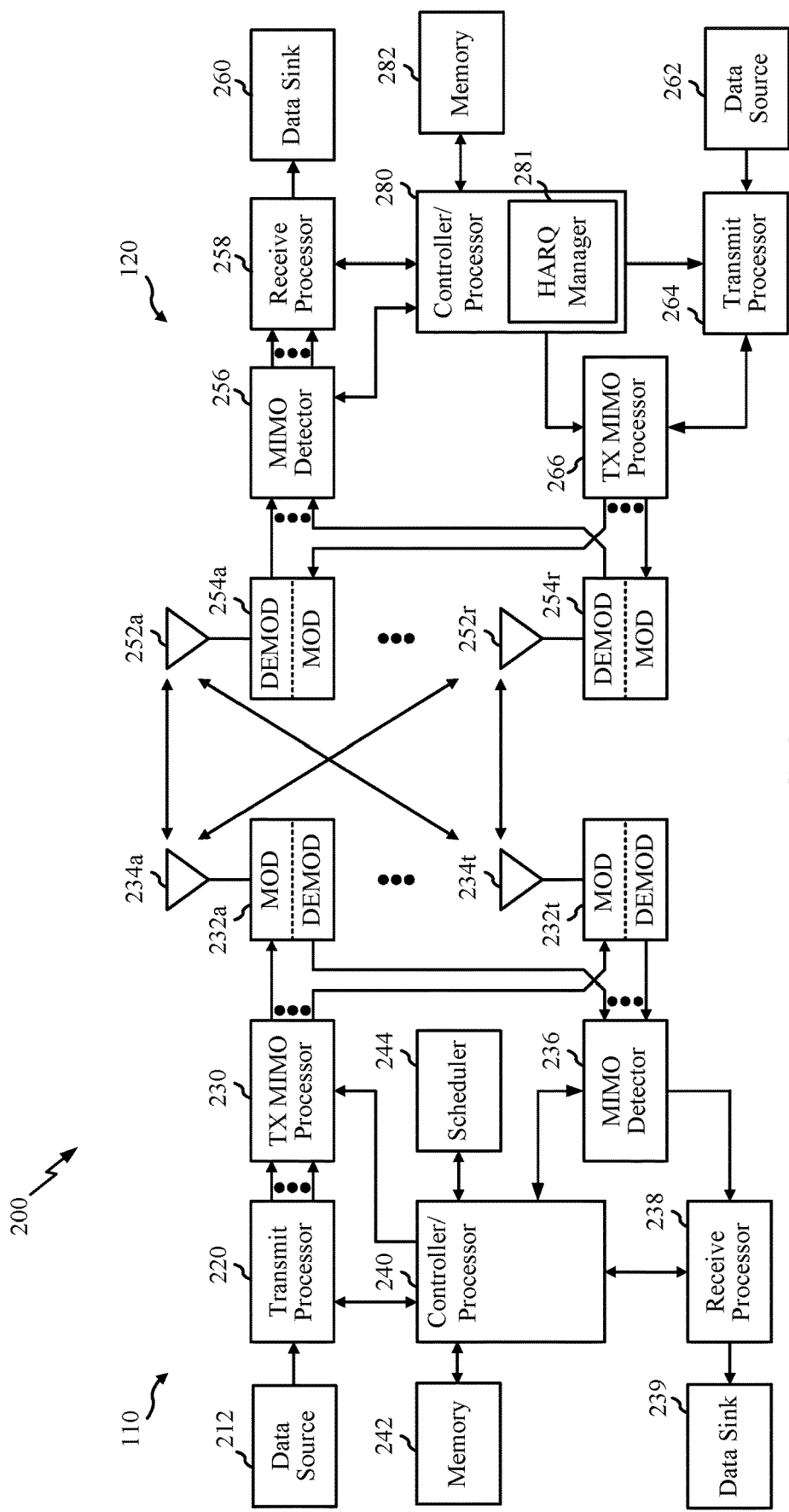
FIG. 2 is a block diagram conceptually illustrating a design of an example a base station (BS) and user equipment (UE), in accordance with certain aspects of the present disclosure.

FIG. 2 illustrates example components of BS 110 and UE 120 (e.g., in the wireless communication network 100 of FIG. 1), which may be used to implement aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink and/or uplink.

The controller/processor 280 and/or other processors and modules at the UE 120 may perform or direct the execution of processes for the techniques described herein. As shown in FIG. 2, the controller/processor 280 of the UE 120 has a HARQ manager 281 that determines which transmissions or transport blocks to drop from HARQ operations based on various rules as further described herein. Although shown at the Controller/Processor, other components of the UE 120 may be used to perform the operations described herein.

FIGS. 3A and 3B illustrate vehicle to everything (V2X) systems, in accordance with certain aspects of the present disclosure. The V2X systems, provided in FIGS. 3A and 3B provides two complementary transmission modes. A first transmission mode involves direct communications (e.g., also referred to as a side link communications) between participants in the local area. Such communications are illustrated in FIG. 3A. A second transmission mode involves network communications through a network as illustrated in FIG. 3B, which may be implemented over a Uu interface (e.g., a wireless communication interface between a radio access network (RAN) and a UE).

Referring to FIG. 3A, a V2X system 300A is illustrated with two vehicles 302, 304. The first transmission mode allows for direct communication between different participants in a given geographic location. As illustrated, the vehicle 302 can have a wireless communication link with an individual (V2P) (e.g., via a UE) through a PC5 interface 306. Communications between the vehicles 302, 304 (V2V) may also occur through a PC5 interface 308. In a like manner, communication may occur from the vehicle 302 to other highway components 310, such as a traffic signal or sign (V2I) through a PC5 interface 312. With respect to each communication link illustrated in FIG. 4A, two-way communication may take place between elements, therefore each element may be a transmitter and a receiver of information. In certain aspects, the V2X system 300A may be a self-managed system and no network assistance is provided. A self-managed system may enable improved spectral efficiency, reduced cost, and increased reliability as network service interruptions do not occur during handover operations for moving vehicles. Resource assignments do not need coordination between operators, and subscription to a network is not necessary, therefore there is reduced complexity for such self-managed systems. The V2X system 300A may be configured to operate in a licensed or unlicensed spectrum, thus any vehicle with an equipped system may access a common frequency and share information. Such harmonized/common spectrum operations allows for safe operation.

Referring to FIG. 3B, a V2X system 300B is illustrated with the vehicles 352, 354, and a network entity 356. A second of two complementary transmission modes is illustrated. In this example, the vehicle 352 may communicate to the other vehicle 354 through network communications via, for example, the network entity 356. These network communications may occur through discrete nodes, such as a base station (e.g., the BS 110*a*), that send and receive information between vehicles. The network communications through vehicle-to-network (V2N) links 358, 360 may be used, for example, for long range communications between vehicles, such as noting the presence of a car accident a certain distance (e.g., 1 mile) ahead along a road or highway. Other types of communication may be sent by the node to vehicles, such as traffic flow conditions, road hazard warnings, environmental/weather reports, service station availability and other like data. Such data can be obtained from cloud-based sharing services.

Figure 4:
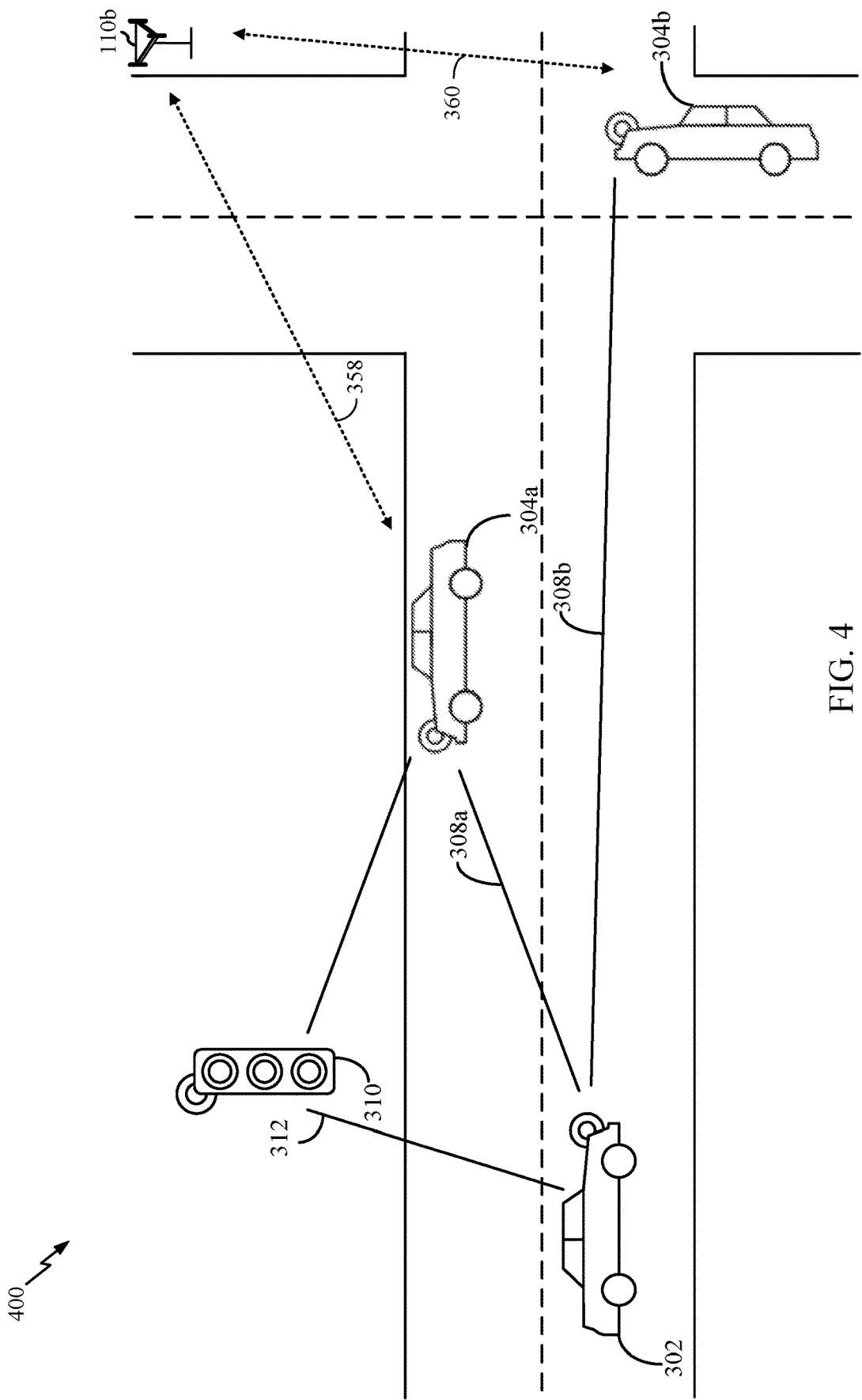

FIG. 4 shows an example V2X system 400 implementing aspects of FIGS. 3A and 3B. Communications between the vehicles 302 and 304*a* may occur through the PC5 interface 308*a*, and communications between the vehicles 302 and 304*b* may occur through the PC5 interface 308*b*. V2I communications may occur through the PC5 interface 312. V2N communications may occur through the wireless links 358, 360.

Example Hybrid Automatic Repeat Request Buffer Management

In certain wireless communication systems (e.g., 5G NR systems), HARQ is employed to improve the reliability of data transmissions. For example, HARQ may provide mechanisms for detecting errors in a transmission (such as a cyclic redundancy check) and forward error correction coding that introduces redundancies (e.g., parity bits) in the transmission to enable a receiver to correct the detected errors. HARQ may also provide a feedback mechanism that enables the receiver to trigger re-transmissions from the transmitter, when an error is detected in a received transmission. In certain cases, a UE may combine retransmissions of the same transport block (TB) to improve decoding performance. For example, the UE may store a received TB having errors in a soft buffer (e.g., a HARQ buffer), and when a re-transmission of the TB is received, the UE may combine the received data with the data currently in the HARQ buffer and attempt to decode the combined data.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, vehicle-to-everything (V2X) communications, device-to-device (D2D) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through a scheduling entity (e.g., a BS), even though the scheduling entity may be utilized for scheduling and/or control purposes. In some examples, the sidelink signals may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions. The PSSCH may carry data transmissions, and the PSFCH may carry feedback such as channel state information related to a sidelink channel quality.

In certain aspects, HARQ re-transmissions may be supported in sidelink communications. In sidelink communications, the UE may receive transmissions from multiple UEs simultaneously. In the absence of a centralized scheduler (e.g., a BS), there may be no guarantee that a HARQ budget will be met. That is, there may be processing limitations (e.g., a HARQ budget) on how many different TBs the UE can simultaneously buffer and still perform HARQ combining. For instance, the UE may be limited by the number of parallel HARQ processes due to the soft buffer capacity and/or limited processing resources. The HARQ budget may also be limited by how far apart in time retransmissions of the same TB can be. If the HARQ budget limitations are exceeded or at capacity, the UE may have to drop some TBs or transmissions.

Aspects of the present disclosure provide mechanisms for choosing which TBs or transmissions are dropped when the HARQ budget (e.g., a soft-buffer limitation or processing capacity) is exceeded. For example, after determining that a HARQ budget is exceeded, a UE may drop transmissions from being processed based on time (e.g., earliest received is dropped), priority (e.g., lowest priority is dropped), a delay budget (e.g., least amount of delay budget is dropped), a number of stored retransmissions, a distance the receiver and transmitter (e.g., farthest away is dropped), a signal strength/quality (e.g., weakest signal is dropped), or a feedback type (e.g., ACK-based feedback is dropped) as further described herein. Dropping a transmission and/or TB may enable the UE to avoid overloading HARQ operations and/or provide reliable sidelink communications.

Figure 5A:
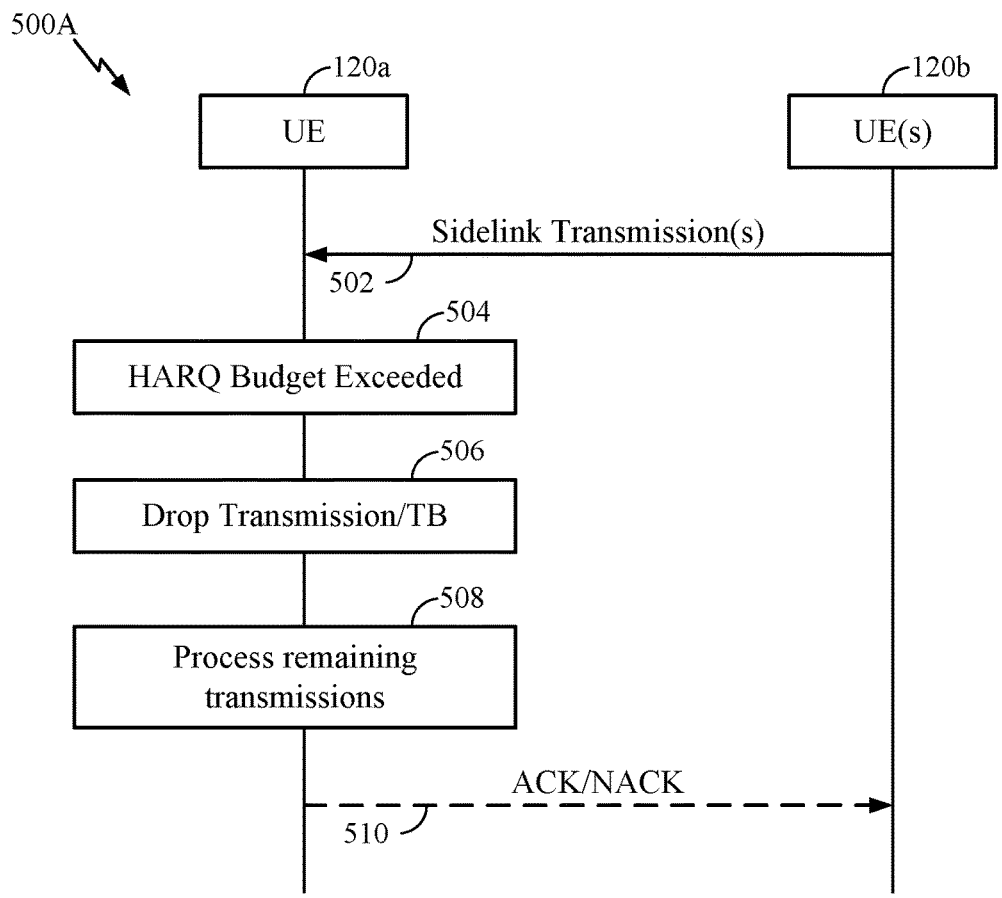
FIG. 5A is a call flow diagram illustrating example operations for managing a HARQ budget at a receiver, in accordance with certain aspects of the present disclosure.

FIG. 5A is a call flow diagram illustrating example operations 500A for managing the HARQ budget at a receiver (e.g., UE 120a) while communicating via sidelink air interfaces, in accordance with certain aspects of the present disclosure. At 502, the UE 120a may receive one or more transmissions from one or more UEs 120b via sidelink air interfaces (e.g., PSDCH, PSSCH, or PSFCH). At 504, the UE 120a may determine that a HARQ budget is exceeded based on the received transmissions. At 506, the UE 120a may drop a set of the received transmissions or a TB associated with the set of received transmissions, from being processed, according to various rules, such as a rule based on the time, priority, packet delay budget, distance, signal strength/quality, or a feedback type as further described herein.

At 508, the UE 120a may process the remaining received transmissions, such as attempting to decode the received transmissions according to a HARQ operation. For example, if one of the received transmissions is a retransmission, the UE 120a may combine the received data with the data currently in the soft buffer for the TB associated with the retransmission and attempt to decode the combined data. As another example, if the data was not successfully decoded for the TB, the UE 120a may replace the data in the soft buffer for the TB with the data which the UE 120a attempted to decode.

At 510, the UE 120a may send an Acknowledgement (ACK) message and/or a Negative Acknowledgement (NACK) message to the UE(s) 120b or a base station (not shown). For instance, if the UE 120a successfully decoded one of the transmissions, the UE 120a may send an ACK message to the UE 120b. In other cases, if the UE 120a did not successfully decode one of the transmissions, the UE 120a may send a NACK message to the UE 120b, or the UE 120a may not send the NACK message, and the absence of the ACK message may indicate to the UE 120b that the transmission was not successfully decoded.

Figure 5B:
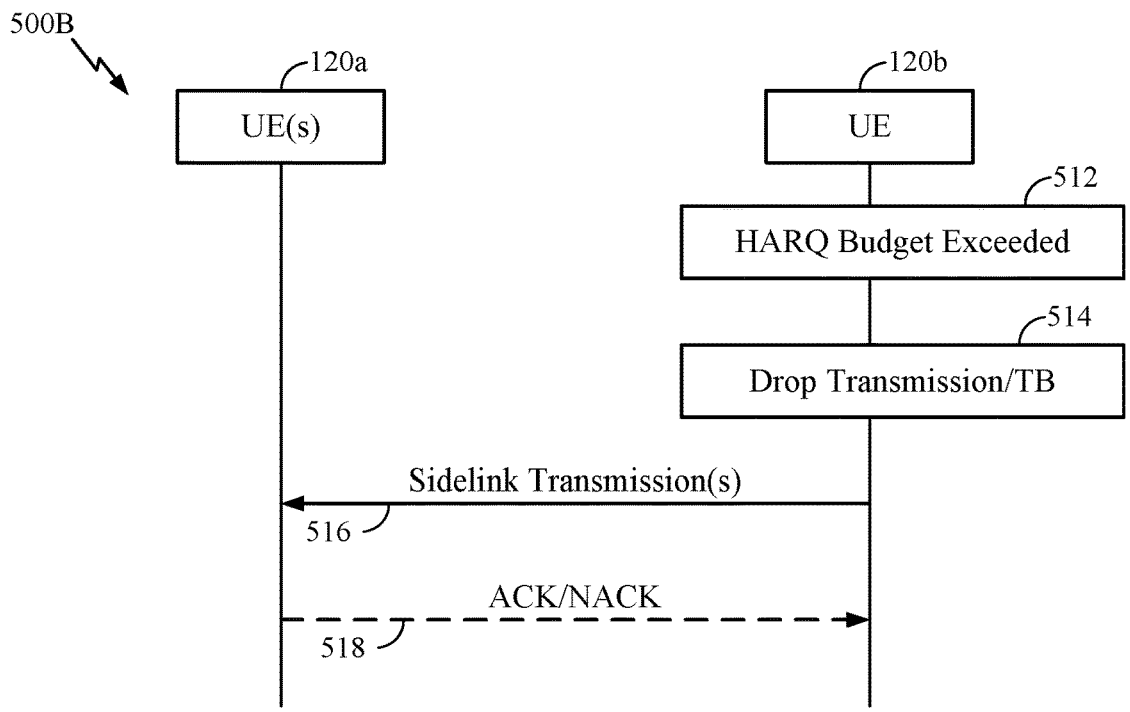
FIG. 5B is a call flow diagram illustrating example operations for managing a HARQ budget at a transmitter, in accordance with certain aspects of the present disclosure.
Figure 7:
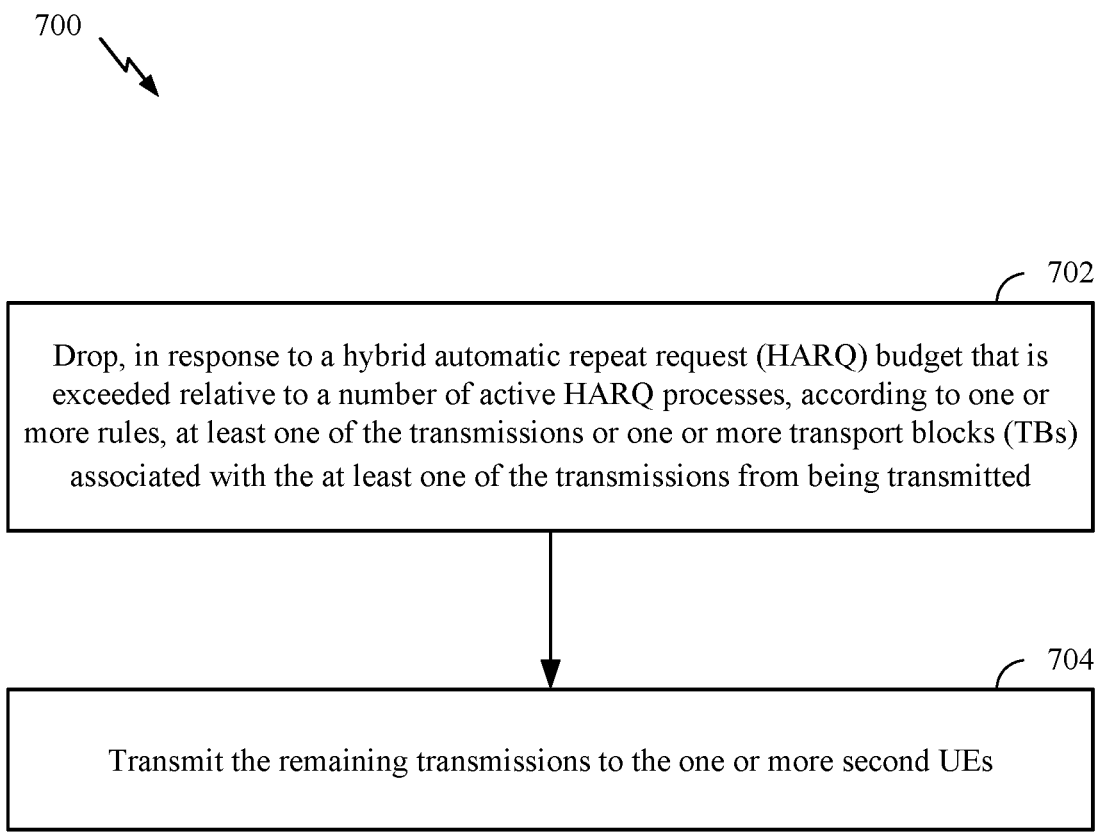
FIG. 7 is a flow diagram illustrating example operations for wireless communication for managing a HARQ budget at a transmitter by a UE, in accordance with certain aspects of the present disclosure.

While the example depicted in FIG. 5A is described herein with respect to a receiver (e.g., UE 120a of FIG. 5A) dropping transmissions or TBs to facilitate understanding, aspects of the present disclosure may also be applied to a transmitter (e.g., UE 120b of FIG. 5A) dropping transmission(s) or TB(s) for managing a HARQ budget as further described herein with respect to FIGS. 5B and 7.

FIG. 5B is a call flow diagram illustrating example operations 500B for managing the HARQ budget at a transmitter (e.g., UE 120b) while communicating via sidelink air interfaces, in accordance with certain aspects of the present disclosure. At 512, the UE 120b may determine that a HARQ budget is exceeded based on various transmissions scheduled to be transmitted to one or more UEs 120a. For example, the UE 120b may generate or obtain various payloads for transmission to the UE(s) 120a, and the UE 120b may determine that the HARQ budget is exceeded the number of active HARQ processes associated with the scheduled transmissions for the various payloads. At 514, the UE 120b may drop a set of the transmissions or a TB associated with the transmissions, from being transmitted, according to various rules, such as a rule based on the time, priority, packet delay budget, distance, or a feedback type as further described herein. At 516, the UE 120b may transmit the remaining transmissions (e.g., the un-dropped transmissions) to the UE(s) 120a via a sidelink channel. At 518, the UE 120b may receive an ACK message and/or a NACK message from the UE(s) 120a. In certain cases, the UE 120b may transmit an ACK message and/or a NACK messaged, based on the dropped transmission(s), to a base station (not shown).

Figure 6:
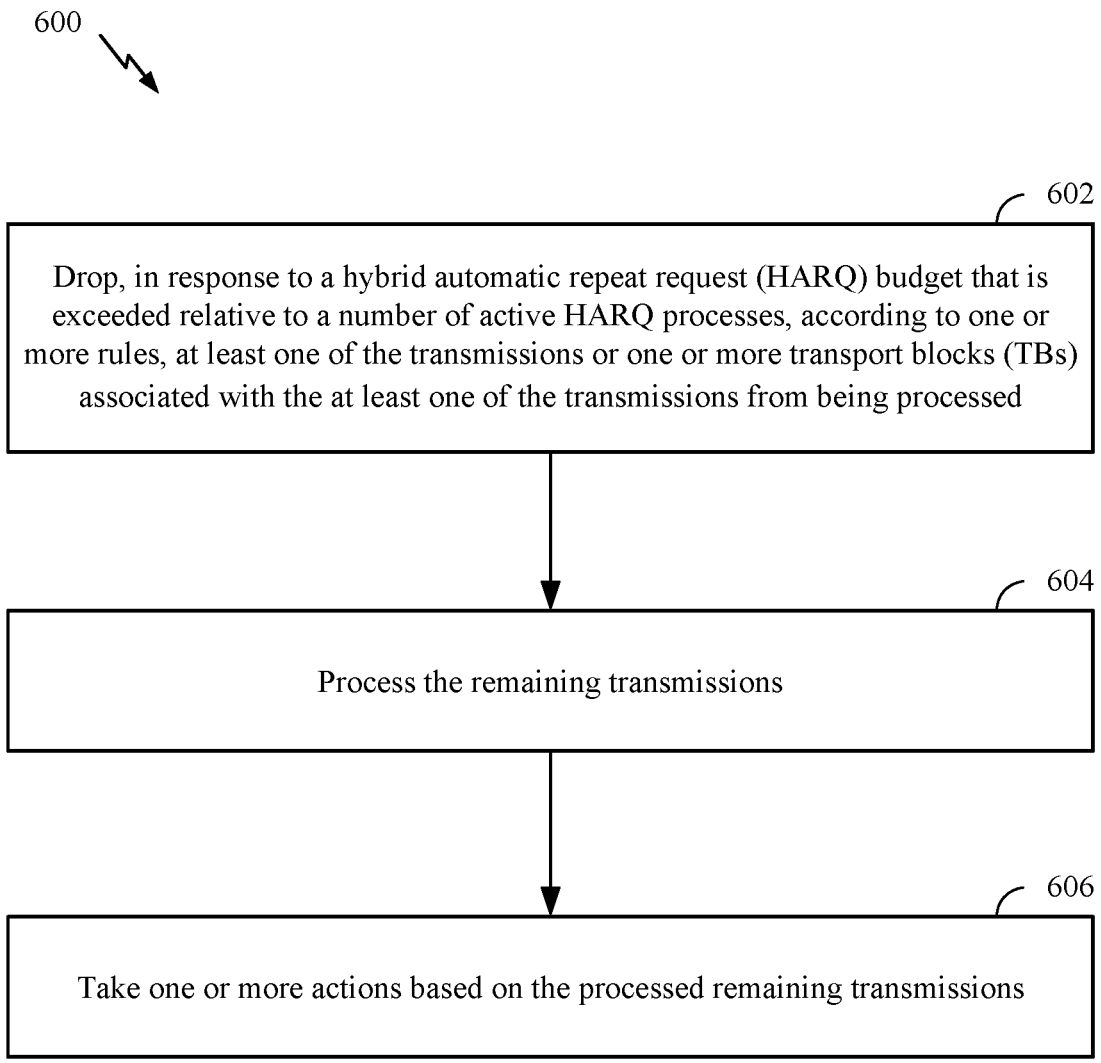
FIG. 6 is a flow diagram illustrating example operations for wireless communication for managing a hybrid automatic repeat request (HARQ) budget at a receiver by a UE, in accordance with certain aspects of the present disclosure.

FIG. 6 is a flow diagram illustrating example operations 600 for wireless communication, in accordance with certain aspects of the present disclosure. The operations 600 may be performed, for example, by a UE (e.g., UE 120a or UE 120b in the wireless communication network 100). Operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) or circuitry obtaining and/or outputting signals.

The operations 600 may begin, at 602, where a first UE may drop, in response to a HARQ budget that is exceeded relative to a number of active HARQ processes, according to one or more rules, at least one of the transmissions or one or more TBs associated with the at least one of the transmissions from being processed. At 604, the first UE may process the remaining transmissions (e.g., the un-dropped transmissions). At 606, the first UE may take one or more actions based on the processed remaining transmissions.

As the first UE may have a limited HARQ budget, the first UE may determine that the HARQ budget is exceeded based on various thresholds. As used herein, a HARQ budget that is exceeded may refer to the HARQ budget being at a certain capacity or state in which certain transmission(s) cannot be processed or transmitted. For example, a HARQ budget is exceeded relative to a number of active HARQ processes when a specific number of active HARQ processes is reached. That is, when there is a specific number of active HARQ processes, the HARQ budget may be exceeded or at capacity, and the first UE may proceed with dropping a transmission and/or TB. In aspects, the HARQ budget monitored by the first UE may be a HARQ budget allocated to sidelink communications. That is, the first UE may have a separate HARQ budget associated with downlink and/or uplink communications with a base station (e.g., the BS 110a of FIG. 1) and a separate HARQ budget associated with sidelink communications with other UEs. In certain aspects, the UE may determine that at least one of a number of received transmissions, a number of time-domain resources associated with the received transmissions (e.g., a packet delay budget or a reception time), the number of active HARQ processes, a soft buffer capacity, or a combination thereof is equal to or greater than one or more thresholds. As an example, the UE may determine that the number of received transmissions is at or above (greater than or equal to) a threshold value. In other aspects, the UE may determine that a reception time of a received transmission in terms of time domain resources (e.g., slots) is greater than or equal to a threshold (e.g., a maximum number of slots from the current slot or latest slot of the received transmission). In some cases, the UE may determine that the active number of HARQ process associated with the received transmissions may be equal to or greater than a threshold (e.g., a maximum of 16 HARQ processes). In other cases, the UE may determine that the soft buffer capacity is equal to or greater than a threshold (e.g., a number of bits or transport blocks). That is, because the UE has previously stored transmissions in the soft buffer, the UE may not have enough storage capacity to perform HARQ operations on new transmissions and/or retransmissions.

After determining the HARQ budget is exceeded, the first UE may drop a received transmission by identifying that the transmission satisfies one or more rules and dropping the transmission or the TB associated with the transmission from being processed based on the identification. In other words, the first UE may select some transmissions based on the transmissions satisfying one or more rules and drop the selected transmissions from being processed. For example, the first UE may select the transmissions with the lowest priority to be dropped from processing. Expressed as another way, the first UE may select other transmissions that are to be processed based on the other transmissions not satisfying one or more rules. For example, the first UE may select other transmissions with priorities higher than the lowest priority to be processed.

The first UE may determine to drop the transmissions and/or a TB associated with one of the transmissions according to various rules. In aspects, the rules may be based on at least one of a time-domain threshold (e.g., a number of slots) associated with the received transmissions, a priority level associated with the received transmissions, a number of remaining retransmissions, a distance between the first UE and the second UEs, a signal quality of the received transmissions, a feedback-type associated with the received transmissions, or a combination thereof. The first UE may select the transmissions to drop based on a combination of the one or more rules.

The first UE may determine to drop the transmission and/or TB based on a reception time associated with each of the received transmissions. As an example, the UE may drop the earliest (oldest) received transmissions from being process. In aspects, the UE may identify the transmissions that were received before a time-domain resource (e.g., $slot_{N-i}$ from the current $slot_N$, where i is the number of slots before $slot_N$) or an absolute value of time (e.g., 20 ms), and these identified transmissions may be dropped. That is, the UE may drop the transmission received before (or outside) a certain window of time-domain resources (e.g., a window of 4 slots or a window of 20 ms) relative to a current time-domain resource or another suitable reference such as the latest (or newest) received transmission. Expressed another way, if the HARQ budget is defined in terms of slots, transmission(s) before $slot_{N-i}$ may be dropped. In other aspects, the first UE may drop the transmissions with the latest reception times.

In certain aspects, the first UE may determine to drop the transmission and/or TB based on a priority associated with the received transmissions. A priority level may indicate a priority in scheduling resources among quality-of-service (QoS) flows. A lowest priority level value may correspond to the highest priority. In aspects, the first UE may identify the transmissions with the lowest priority level compared to priorities (e.g., priority level values) of other received transmissions and drop the lowest priority transmissions from being processed. Expressed another way, the transmission(s) with the lowest priority may be dropped. In other aspects, the transmission(s) with the highest priority may be dropped. In still other aspects, the first UE may drop the transmissions based on the priority associated with the transmissions relative to a threshold value (e.g., dropping transmissions with a priority ≥a priority level value of 20).

The priority of a transmission may be determined based on a priority level encoded in a file or packet of the transmission. For example, a QoS indicator (e.g., 5QI) encoded in a packet may correspond to various QoS characteristics, including a resource type, priority level, packet delay budget, packet error rate, averaging window, or maximum data burst volume. That is, the QoS indicator may indicate various QoS characteristics including the priority level.

In aspects, the first UE may determine to drop the transmission and/or TB based on a number of remaining retransmissions associated with the transmissions. For instance, the first UE may drop the transmissions with the greatest number of remaining retransmissions or the least number of remaining retransmissions. In other aspects, the first UE may drop the transmissions based on the number of remaining retransmissions associated with the transmissions relative to a threshold value (e.g., dropping transmissions with a number of retransmission ≥4 retransmissions remaining).

In certain aspects, the first UE may determine to drop the transmission and/or TB based on a distance associated with each of the second UEs relative to the first UE. For instance, the first UE may drop the transmissions from the second UEs that are farthest away from the first UE. That is, the first UE may identify the second UEs that are farthest from the first UE compared to the other second UEs, and the first UE may drop the transmissions from the farthest second UEs from the first UE. In other aspects, the first UE may drop the transmissions from the second UEs that are closest to the first UE. In other aspects, the first UE may drop the transmissions based on the distance associated with the transmissions relative to a threshold value (e.g., dropping transmissions with a distance ≥500 meters).

In aspects, the first UE may determine to drop the transmission and/or TB based on a signal quality associated with the received transmissions. The signal quality may include at least one of a signal-to-noise-plus-interference ratio (SINR), a signal-to-noise ratio (SNR), a reference signal received power (RSRP), a reference signal received quality (RSRQ), a received signal strength indicator (RSSI), or a combination thereof. The first UE may drop the transmission with the weakest signal quality. That is, the first UE may identify the transmission with the weakest signal quality compared to a signal quality of other received transmissions, and the first UE may drop the identified transmissions. In other aspects, the first UE may drop the transmission with the strongest signal quality. In other aspects, the first UE may drop the transmissions based on the signal quality associated with the transmissions relative to a threshold value (e.g., dropping transmissions with a signal quality ≤−100 dBm (RSRP) or 7 dB (SINR)).

Additionally or alternatively, the first UE may determine to drop the transmission and/or TB based on a feedback type associated with the received transmissions. For example, the first UE may drop the transmissions with ACK-based feedback. The ACK-based feedback may refer to HARQ feedback configurations where the receiver sends an ACK message to the transmitter, when the receiver successfully decodes the transmission, but the receiver may not send a NACK message to the transmitter, when an error is detected in the received transmission by the receiver. The first UE may identify the transmission has an acknowledge-based feedback type and drop the transmission from being processed.

While some examples provided herein are described with respect to dropping a transmission from being processed to facilitate understanding, aspects of the present disclosure may also be applied to dropping a transport block or a code block group (e.g., a group of code blocks which make up a portion of a transport block) associated with the transmission identified as satisfying one or more rules for managing the HARQ budget. For example, the first UE may drop one or more TBs associated with the transmissions that satisfy the one or more rules as described herein. In such a case, the first UE may drop any remaining or subsequent retransmissions of the TB from being processed. For example, the first UE may receive a retransmission associated with the dropped TB, determine that the retransmission is associated with the dropped TB, and drop the retransmission from being processed based on the determination.

If the first UE drops a transmission and subsequently receives a retransmission of the dropped transmission, the first UE may attempt to decode the TB associated with the retransmission assuming the HARQ budget is still not exceeded. That is, dropping a transmission may not affect the HARQ operations associated with subsequent retransmissions, whereas dropping a TB will block processing of any subsequent retransmissions associated with the TB.

In certain aspects, the first UE may identify multiple received transmissions to drop based on a rule and resolve the ties according to various tie breakers. For example, the first UE may resolve ties by dropping all the transmissions that satisfy one of the rules. In other words, the first UE may identify all of the transmissions that satisfy one of the rules and drop all these identified transmissions. For example, the first UE may drop all the earliest received transmissions.

In other aspects, the first UE may apply another rule to resolve ties or narrow the number of transmissions being dropped. That is, the first UE may use another rule to break ties or narrow the number of transmissions being dropped. For example, the first UE may identify the transmissions with the lowest priority, and then identify the transmissions with the earliest reception time among the transmissions with the lowest priority. The first UE may then drop the identified transmissions with the earliest reception times among the transmissions with the lowest priority. Express another away, the first UE may identify a first set of transmissions that satisfy a first rule of the one or more rules; after identifying the first set of the transmissions, identify a second set of the first set of the transmissions that satisfy a second rule of the one or more rules; and drop the second set of the first set of the transmissions or the one or more TBs associated with the second set of the first set of the transmissions from being processed.

In still other aspects, the first UE may break ties on a rule by randomly selecting one or more of the transmissions identified as satisfying one of the rules. For example, the first UE may identify transmissions that satisfy one of the rules; randomly select at least one of the identified transmissions; and drop the selected transmissions or the one or more TBs associated with the selected transmissions from being processed.

The first UE may communicate with the second UEs via various sidelink communication channels or air interfaces. Before dropping at 602, the first UE may receive the transmissions from the one or more second UEs via a sidelink channel, for example. In aspects, the first UE may communicate with the second UEs on the PSCCH, PSSCH, and/or PSFCH. Any of the sidelink channels may support the HARQ buffer management operations described herein. In certain aspects, the transmissions selected and dropped from being processed may be sidelink transmissions received via sidelink communication channels, such as the PSCCH, PSSCH, and/or PSFCH. That is, the first UE may have a separate HARQ budget and corresponding HARQ operations for managing downlink and/or uplink transmissions.

The first UE may process the remaining transmissions by attempting to decode the data of the remaining transmissions according to HARQ operations (such as combining data stored in the HARQ buffer with a received retransmission). The remaining transmission may include the received transmissions that were not dropped from being processed at 602.

The first UE may take various actions based on the processed remaining transmissions. In certain aspects, the first UE may forward the decoded transmissions to at least one of a base station (e.g., BS 110*a*) or a third UE. In aspects, taking one or more actions based on the processed remaining transmissions may include the first UE sending at least one of an ACK message or a NACK message to the second UEs or a base station (e.g., the BS 110*a*). For example, if the first UE successfully decodes one of the transmissions, the first UE may send an ACK message to the second UE that transmitted the decoded transmission. If the first UE does not successfully decode one of the transmissions, the first UE may send a NACK message to the second UE that transmitted the decoded transmission, or the first UE may send a resource grant indicating to the second UE to resent the transmission, or the first UE may not send any message to the second UE.

In certain aspects, the first UE may receive, from a BS, a configuration indicating the one or more rules for dropping transmissions from HARQ processing as described herein. For example, the first UE may receive downlink control signaling such as radio resource control (RRC) message, downlink control information (DCI), or a medium access control (MAC) control element (MAC-CE) that indicates the one or more rules for dropping transmissions.

FIG. 7 is a flow diagram illustrating example operations 700 for wireless communication, in accordance with certain aspects of the present disclosure. The operations 700 may be performed, for example, by a UE (e.g., UE 120*a* or UE 120*b* in the wireless communication network 100). Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) or circuitry obtaining and/or outputting signals.

The operations 700 may begin, at 702, where a first UE may drop, in response to a HARQ budget that is exceeded relative to a number of active HARQ processes, according to one or more rules, at least one of the transmissions or one or more TBs associated with the at least one of the transmissions from being transmitted. At 704, the first UE may transmit the remaining transmissions (e.g., the un-dropped transmissions) to the one or more second UEs.

As the first UE may have a limited HARQ budget, the first UE may determine that the HARQ budget is exceeded based on various thresholds, for example, as described herein with respect to the operations 600. In certain aspects, the UE may determine that at least one of a number of transmissions, a number of time-domain resources associated with the transmissions (e.g., a packet delay budget or a reception time), the number of active HARQ processes, a soft buffer capacity, or a combination thereof is equal to or greater than one or more thresholds. As an example, the UE may determine that the number of transmissions is at or above (greater than or equal to) a threshold value. In other aspects, the UE may determine that a scheduled transmission time of a transmission in terms of time domain resources (e.g., slots) is greater than or equal to a threshold (e.g., a maximum number of slots from the current slot). In some cases, the UE may determine that the active number of HARQ process associated with the transmissions may be equal to or greater than a threshold (e.g., a maximum of 16 HARQ processes). In other cases, the UE may determine that the soft buffer capacity is equal to or greater than a threshold (e.g., a number of bits or transport blocks). That is, because the UE has previously stored transmissions in the soft buffer, the UE may not have enough storage capacity to perform HARQ operations on new transmissions and/or retransmissions.

After determining the HARQ budget is exceeded, the first UE may drop a transmission by identifying that the transmission satisfies one or more rules and dropping the transmission or the TB associated with the transmission from being processed based on the identification. In other words, the first UE may select some transmissions based on the transmissions satisfying one or more rules and drop the selected transmissions from being processed. For example, the first UE may select the transmissions with the lowest priority to be dropped from processing. Expressed as another way, the first UE may select other transmissions that are to be transmitted based on the other transmissions not satisfying one or more rules. For example, the first UE may select other transmissions with priorities higher than the lowest priority to be transmitted.

The first UE may determine to drop the transmissions and/or a TB associated with one of the transmissions according to various rules. In aspects, the rules may be based on at least one of a time-domain threshold (e.g., a number of slots) associated with the transmissions, a priority level associated with the transmissions, a delay budget associated with the transmissions, a number of remaining retransmissions, a distance between the first UE and the second UEs, a feedback-type associated with the transmissions, or a combination thereof. The first UE may select the transmissions to drop based on a combination of the one or more rules.

The first UE may determine to drop the transmission and/or TB based on a transmission time associated with each of the transmissions. As an example, the UE may drop the earliest (oldest) transmissions from being transmitted. In aspects, the UE may identify the transmissions that are scheduled before a time-domain resource (e.g., $slot_{N-i}$ from the current $slot_N$, where i is the number of slots before $slot_N$) or an absolute value of time (e.g., 20 ms), and these identified transmissions may be dropped. That is, the UE may drop the transmission scheduled before (or outside) a certain window of time-domain resources (e.g., a window of 4 slots or a window of 20 ms) relative to a current time-domain resource or another suitable reference such as the latest (or newest) scheduled transmission. Expressed another way, if the HARQ budget is defined in terms of slots, transmission(s) before $slot_{N-i}$ may be dropped. In other aspects, the first UE may drop the transmissions with the latest transmission times.

In certain aspects, the first UE may determine to drop the transmission and/or TB based on a priority associated with the scheduled transmissions. A priority level may indicate a priority in scheduling resources among quality-of-service (QoS) flows. A lowest priority level value may correspond to the highest priority. In aspects, the first UE may identify the transmissions with the lowest priority level compared to priorities (e.g., priority level values) of other transmissions and drop the lowest priority transmissions from being processed. Expressed another way, the transmission(s) with the lowest priority may be dropped. In other aspects, the transmission(s) with the highest priority may be dropped. In still other aspects, the first UE may drop the transmissions based on the priority associated with the transmissions relative to a threshold value (e.g., dropping transmissions with a priority ≥a priority level value of 20). The priority of a transmission may be determined based on a priority level encoded in a file or packet of the transmission as described herein with respect to the operations 600.

In aspects, the first UE may determine to drop the transmission and/or TB based on a packet delay budget associated with the transmissions. In general, the packet delay budget may refer to an upper bound for the time that a packet may be delayed between a UE and a packet destination/origination point in a wireless communication system, such as another UE in a sidelink transmission or a user-plane function (UPF) of a 5G Core Network (5GC) that terminates to a data network (DN). The packet delay budget may be derived from the QoS indicator associated with various services, such as V2X messages, augmented reality, conversational voice, etc. For example, the transmissions with the least amount of packet delay budget (e.g., 10 ms) may include low latency transmissions such as URLLCs including discrete automation or augmented/virtual reality services, and the transmissions with a greater packet delay budget (e.g., 100 ms) available may include eMBB transmissions including conversational voice or video services.

In certain aspects, the first UE may identify the transmissions with the least amount of time remaining in a packet delay budget compared to delay budgets of other scheduled transmissions, and the first UE may drop these transmissions from being processed. That is, the transmissions with least amount of time remaining in the packet delay budget may be dropped. In other aspects, the first UE may identify the transmissions with a greatest amount of time remaining in a packet delay budget compared to delay budgets of other transmissions, and the first UE may drop these transmissions from being processed. In other words, the transmissions with the most amount of time remaining in a packet delay budget may be dropped. In still other aspects, the first UE may drop the transmissions based on the packet delay budget associated with the transmissions relative to a threshold value (e.g., dropping transmissions with a packet delay budget ≤10 ms).

In aspects, the first UE may determine to drop the transmission and/or TB based on a number of remaining retransmissions associated with the transmissions. For instance, the first UE may drop the transmissions with the greatest number of remaining retransmissions or the least number of remaining retransmissions. In other aspects, the first UE may drop the transmissions based on the number of remaining retransmissions associated with the transmissions relative to a threshold value (e.g., dropping transmissions with a number of retransmission ≥4 retransmissions remaining).

In certain aspects, the first UE may determine to drop the transmission and/or TB based on a distance associated with each of the second UEs relative to the first UE. For instance, the first UE may drop the transmissions from the second UEs that are farthest away from the first UE. That is, the first UE may identify the second UEs that are farthest from the first UE compared to the other second UEs, and the first UE may drop the transmissions from the farthest second UEs from the first UE. In other aspects, the first UE may drop the transmissions from the second UEs that are closest to the first UE. In other aspects, the first UE may drop the transmissions based on the distance associated with the transmissions relative to a threshold value (e.g., dropping transmissions with a distance ≥500 meters).

Additionally or alternatively, the first UE may determine to drop the transmission and/or TB based on a feedback type associated with the transmissions. For example, the first UE may drop the transmissions with ACK-based feedback. The ACK-based feedback may refer to HARQ feedback configurations where the receiver sends an ACK message to the transmitter, when the receiver successfully decodes the transmission, but the receiver may not send a NACK message to the transmitter, when an error is detected in the received transmission by the receiver. The first UE may identify the transmission has an acknowledge-based feedback type and drop the transmission from being processed.

While some examples provided herein are described with respect to dropping a transmission from being processed to facilitate understanding, aspects of the present disclosure may also be applied to dropping a transport block associated with the transmission identified as satisfying one or more rules for managing the HARQ budget. For example, the first UE may drop one or more TBs associated with the transmissions that satisfy the one or more rules as described herein. In such a case, the first UE may drop any remaining or subsequent retransmissions of the TB from being transmitted. For example, the first UE may obtain an indication to send a retransmission associated with the dropped TB, determine that the retransmission is associated with the dropped TB, and drop the retransmission from being transmitted based on the determination.

If the first UE drops a transmission and subsequently obtains an indication to resend the dropped transmission, the first UE may transmit a retransmission of the dropped transmission assuming the HARQ budget is still not exceeded. That is, dropping a transmission may not affect the HARQ operations associated with subsequent retransmissions, whereas dropping a TB will block processing of any subsequent retransmissions associated with the TB.

In certain aspects, the first UE may identify multiple transmissions to drop based on a rule and resolve the ties according to various tie breakers as described herein with respect to operations 600.

The first UE may communicate with the second UEs via various sidelink communication channels or air interfaces. In aspects, the first UE may communicate with the second UEs on the PSCCH, PSSCH, and/or PSFCH. For example, the remaining transmissions may be transmitted to the one or more second UEs at 704 via a sidelink channel. Any of the sidelink channels may support the HARQ buffer management operations described herein. In certain cases, the first UE may have a separate HARQ budget and corresponding HARQ operations for managing downlink and/or uplink transmissions.

In certain aspects, the first UE may receive, from a BS, a configuration indicating the one or more rules for dropping transmissions from HARQ processing as described herein. For example, the first UE may receive downlink control signaling such as RRC message, DCI, or a MAC-CE that indicates the one or more rules for dropping transmissions.

In certain cases, the first UE may transmit, to a base station, an ACK message or a NACK message, based on the transmission(s) dropped or remaining transmissions sent to the second UEs. The ACK/NACK message may indicate, to the base station, whether the first UE successfully transmitted the remaining transmissions or whether the first UE dropped a transmission.

Figure 8:
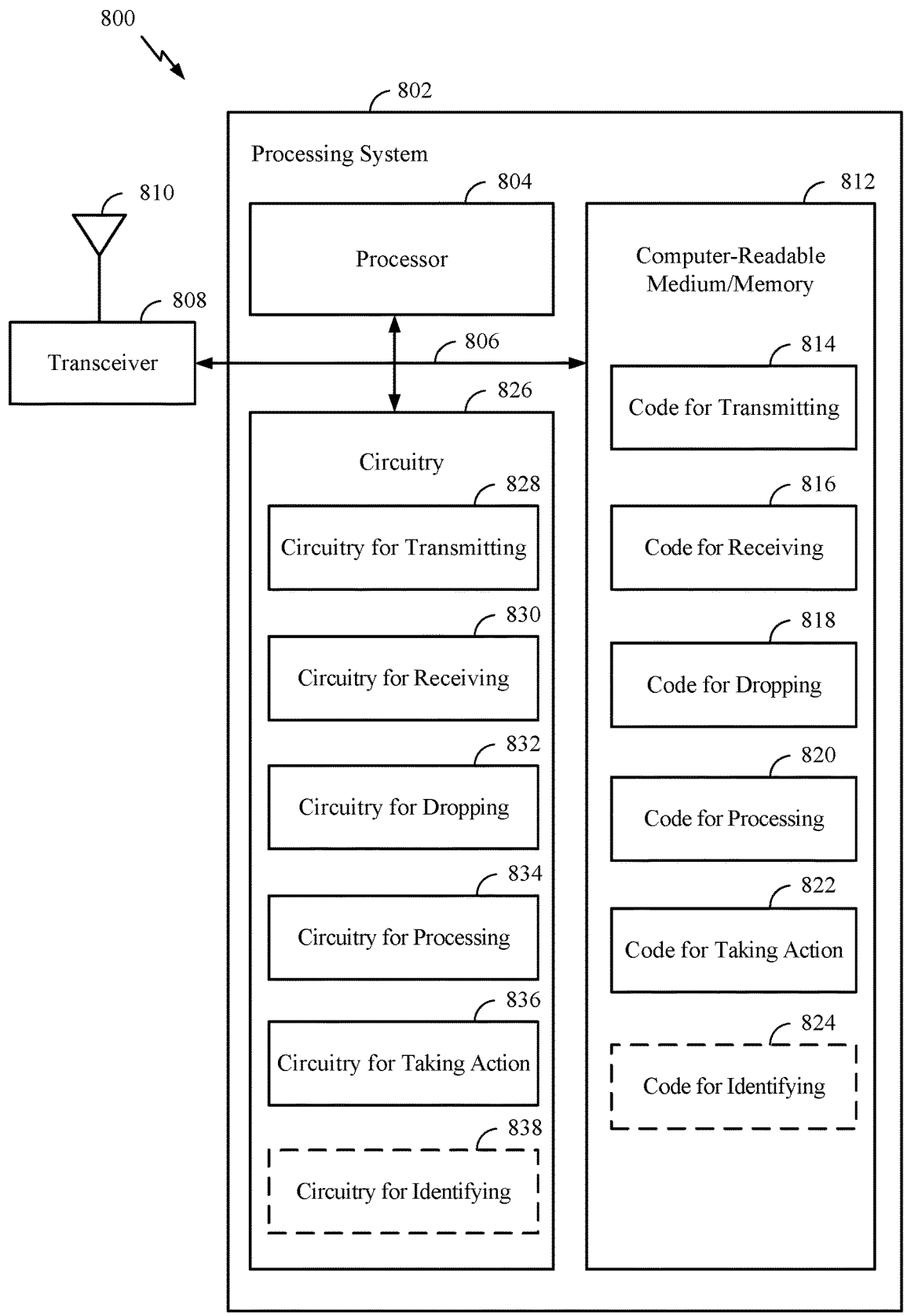
FIG. 8 illustrates a communications device that may include various components configured to perform operations for the techniques disclosed herein in accordance with aspects of the present disclosure.

FIG. 8 illustrates a communications device 800 (e.g., the UE 120a or UE 120b shown in FIG. 1) that may include various components (e.g., corresponding to means-plus-function components) configured to perform operations for the techniques disclosed herein, such as the operations illustrated in FIG. 6 and/or FIG. 7. The communications device 800 includes a processing system 802 coupled to a transceiver 808 (e.g., a transmitter and/or receiver). The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 6 and/or FIG. 7, or other operations for performing the various techniques discussed herein for managing a HARQ budget. In certain aspects, computer-readable medium/memory 812 stores code for transmitting 814, code for receiving 816, code for dropping 818, code for processing 820, code for taking action 822, and/or code for identifying 824. In certain aspects, the processing system 802 has circuitry 826 configured to implement the code stored in the computer-readable medium/memory 812. In certain aspects, the circuitry 826 is coupled to the processor 804 and/or the computer-readable medium/memory 812 via the bus 806. The circuitry 826 includes circuitry for transmitting 828 (an example of means for transmitting), circuitry for receiving 830 (an example of means for receiving), circuitry for dropping 832 (an example of means for dropping), circuitry for processing 834 (an example of means for processing), circuitry for taking action 836 (an example of means for taking action), and/or circuitry for identifying 838 (an example of means for identifying).

Means for transmitting may include an antenna (e.g., the antennas 252a-252r), a transceiver (e.g., the transceivers 254a-254r), a processor (e.g., the controller/processor 280), and/or circuitry for receiving (e.g., the circuitry for receiving 830). Means for receiving may include an antenna (e.g., the antennas 252a-252r), a transceiver (e.g., the transceivers 254a-254r), a processor (e.g., the controller/processor 280), and/or circuitry for transmitting (e.g., the circuitry for transmitting 828). Means for dropping may include a processor (e.g., the controller/processor 280) and/or circuitry for dropping (e.g., the circuitry for dropping 832). Means for processing may include a processor (e.g., the controller/processor 280) and/or circuitry for processing (e.g., the circuitry for processing 834). Means for taking action may include a processor (e.g., the controller/processor 280) and/or circuitry for taking action (e.g., the circuitry for taking action 836). Means for identifying may include a processor (e.g., the controller/processor 280) and/or circuitry for identifying (e.g., the circuitry for identifying 838). In aspects, the various processors and/or various circuitry may include a circuit, a central processing unit (CPU), a graphics processing unit (GPU), a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein.

In addition to the examples described above, many examples of specific combinations are within the scope of the disclosure, some of which are detailed below:

Example 1: A method of wireless communication by a first user equipment (UE), comprising dropping, in response to a hybrid automatic repeat request (HARQ) budget that is exceeded relative to a number of active HARQ processes, according to one or more rules, at least one of the transmissions or one or more transport blocks (TBs) associated with the at least one of the transmissions from being processed; processing the remaining transmissions; and taking one or more actions based on the processed remaining transmissions.

Example 2: The method of example 1, wherein dropping the at least one of the transmissions or the one or more TBs from being processed comprises determining that at least one of a number of received transmissions, a number of time-domain resources associated with the received transmissions, or a soft buffer capacity is equal to or greater than one or more thresholds, or a combination thereof.

Example 3: The method of according to any of the preceding examples, wherein dropping the at least one of the transmissions or the one or more TBs from being processed comprises: identifying the at least one of the transmissions that satisfies the one or more rules; and dropping the at least one of the transmissions or the one or more TBs from being processed based on the identification.

Example 4: The method according to any of the preceding examples, wherein the one or more rules are based on at least one of: a time-domain threshold associated with the received transmissions, a priority level associated with the received transmissions, a number of remaining retransmissions, a distance between the first UE and the second UEs, a signal quality of the received transmissions, a feedback-type associated with the received transmissions, or a combination thereof.

Example 5: The method according to examples 3-4, wherein identifying the at least one of the transmissions comprises identifying that the at least one of the transmissions is received before a time-domain resource.

Example 6: The method according to examples 3-5, wherein identifying the at least one of the transmissions comprises identifying that the at least one of the transmissions has a lowest priority compared to priorities of other received transmissions.

Example 7: The method according to examples 3-6, wherein identifying the at least one of the transmissions comprises identifying that at least one of the second UEs, which transmitted the at least one of the transmissions, is farthest from the first UE compared to other of the second UEs.

Example 8: The method according to examples 3-7, wherein identifying the at least one of the transmissions comprises identifying that the at least one of the transmissions has a weakest signal quality compared to a signal quality of other received transmissions.

Example 9: The method according to examples 3-8, wherein identifying the at least one of the transmissions comprises identifying that the at least one of the transmissions has an acknowledge-based feedback type.

Example 10: The method of example 1, wherein dropping the at least one of the transmissions or the one or more TBs from being processed comprises: identifying all of the at least one of the transmissions that satisfy one of the one or more rules; and dropping all of the at least one of the transmissions or the one or more TBs associated with all of the at least one of the transmissions from being processed based on the identification.

Example 11: The method of example 1, wherein dropping the at least one of the transmissions or the one or more TBs from being processed comprises: identifying a first set of the transmissions that satisfy a first rule of the one or more rules; after identifying the first set of the transmissions, identifying a second set of the first set of the transmissions that satisfy a second rule of the one or more rules; and dropping the second set of the first set of the transmissions or the one or more TBs associated with the second set of the first set of the transmissions from being processed.

Example 12: The method according to any of the preceding examples, further comprising receiving the transmissions from the one or more second UEs via a sidelink channel.

Example 13: The method according to any of the preceding examples, wherein processing the remaining transmissions comprises decoding the remaining transmissions.

Example 14: The method according to any of the preceding examples, wherein taking one or more actions based on the processed remaining transmissions comprises forwarding the decoded transmissions to at least one of a base station or a third UE.

Example 15: The method according to any of the preceding examples, wherein taking one or more actions based on the processed remaining transmissions comprises sending at least one of an acknowledgement (ACK) message or a negative acknowledgment (NACK) message to the one or more second UEs or a base station.

Example 16: A method of wireless communication by a first user equipment (UE), comprising: dropping, in response to a hybrid automatic repeat request (HARQ) budget that is exceeded relative to a number of active HARQ processes, according to one or more rules, at least one of the transmissions or one or more transport blocks (TBs) associated with the at least one of the transmissions from being transmitted; and transmitting the remaining transmissions to the one or more second UEs.

Example 17: The method of example 16, wherein dropping the at least one of the transmissions or the one or more TBs from being transmitted comprises determining that at least one of a number of the transmissions, a number of time-domain resources associated with the transmissions, a soft buffer capacity is equal to or greater than one or more thresholds, or a combination thereof.

Example 18: The method according to examples 16 or 17, wherein dropping the at least one of the transmissions or the one or more TBs from being transmitted comprises: identifying the at least one of the transmissions that satisfies the one or more rules; and dropping the at least one of the transmissions or the one or more TBs from being transmitted based on the identification.

Example 19: The method according to examples 16-18, wherein the one or more rules are based on at least one of:

a time-domain threshold associated with the transmissions, a priority level associated with the transmissions, a delay budget associated with the transmissions, a number of remaining retransmissions, a distance between the first UE and the second UEs, a feedback-type associated with the transmissions, or a combination thereof.

Example 20: The method according to examples 18-19, wherein identifying the at least one of the transmissions comprises identifying that the at least one of the transmissions is to be transmitted before a time-domain resource.

Example 21: The method according to examples 18-20, wherein identifying the at least one of the transmissions comprises identifying that the at least one of the transmissions has a lowest priority compared to priorities of other transmissions.

Example 22: The method according to examples 18-21, wherein identifying the at least one of the transmissions comprises identifying that the at least one of the transmissions has a least amount of time remaining in a packet delay budget compared to delay budgets of other transmissions.

Example 23: The method according to examples 18-22, wherein identifying the at least one of the transmissions comprises identifying that the at least one of the transmissions has a greatest amount of time remaining in a packet delay budget compared to delay budgets of other transmissions.

Example 24: The method according to examples 18-23, wherein identifying the at least one of the transmissions comprises identifying that at least one of the second UEs is farthest from the first UE compared to other of the second UEs.

Example 25: The method according to examples 18-24, wherein identifying the at least one of the transmissions comprises identifying that the at least one of the transmissions has an acknowledge-based feedback type.

Example 26: The method of example 16, wherein dropping the at least one of the transmissions or the one or more TBs from being transmitted comprises: identifying all of the at least one of the transmissions that satisfy one of the one or more rules; and dropping all of the at least one of the transmissions or the one or more TBs associated with all of the at least one of the transmissions from being transmitted based on the identification.

Example 27: The method of example 16, wherein dropping the at least one of the transmissions or the one or more TBs from being transmitted comprises: identifying a first set of the transmissions that satisfy a first rule of the one or more rules; after identifying the first set of the transmissions, identifying a second set of the first set of the transmissions that satisfy a second rule of the one or more rules; and dropping the second set of the first set of the transmissions or the one or more TBs associated with the second set of the first set of the transmissions from being transmitted.

Example 28: The method according to examples 16-27, further comprising: transmitting at least one of an acknowledgement (ACK) message or a negative acknowledgment (NACK) message, based on the at least one of the transmissions or the remaining transmissions, to a base station; and wherein the remaining transmissions are transmitted via a sidelink channel to the one or more second UEs.

Example 29: An apparatus for wireless communication, comprising: a memory and a processor coupled to the memory, the processor and the memory configured to: drop, in response to a hybrid automatic repeat request (HARQ) budget that is exceeded relative to a number of active HARQ processes, according to one or more rules, at least one of the transmissions or one or more transport blocks (TBs) associated with the at least one of the transmissions from being processed, process the remaining transmissions, and take one or more actions based on the processed remaining transmissions.

Example 30: The apparatus of example 29, further comprising a communication interface, wherein the communication interface, the processor, and/or the memory are configured to perform any one or more of the aspects or methods included in examples 1-15.

Example 31: An apparatus for wireless communication, comprising: a memory and a processor coupled to the memory, the processor and the memory configured to: drop, in response to a hybrid automatic repeat request (HARQ) budget that is exceeded relative to a number of active HARQ processes, according to one or more rules, at least one of the transmissions or one or more transport blocks (TBs) associated with the at least one of the transmissions from being processed. The apparatus also includes a transmitter configured to transmit the remaining transmissions to the one or more UEs.

Example 32: The apparatus of example 31, wherein the transmitter, the processor, and/or the memory are configured to perform any one or more of the aspects or methods included in examples 16-28.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6 and/or FIG. 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a first user equipment (UE), comprising:
    dropping, in response to a hybrid automatic repeat request (HARQ) budget that is exceeded relative to a number of active HARQ processes, according to one or more rules, at least one of a plurality of transmissions received from one or more second UEs or one or more transport blocks (TBs) associated with the at least one of the plurality of transmissions from being processed, wherein the one or more rules are based at least in part on whether the at least one of the plurality of transmissions is received outside a window of one or more time-domain resources associated with the received plurality of transmissions;
    processing one or more remaining transmissions of the plurality of transmissions; and
    taking one or more actions based on the processed one or more remaining transmissions.

2. The method of claim 1, wherein dropping the at least one of the plurality transmissions or the one or more TBs from being processed comprises determining that at least one of a number of the received plurality of transmissions, a number of time-domain resources associated with the received plurality of transmissions, or a soft buffer capacity is equal to or greater than one or more thresholds, or a combination thereof.

3. The method of claim 1, wherein dropping the at least one of the plurality transmissions or the one or more TBs from being processed comprises:
    identifying the at least one of the plurality of transmissions that satisfies the one or more rules; and
    dropping the at least one of the plurality of transmissions or the one or more TBs from being processed based on the identification.

4. The method of claim 3, wherein the one or more rules are further based on at least one of:
    a priority level associated with the received plurality of transmissions,
    a number of remaining retransmissions,
    a distance between the first UE and the one or more second UEs,
    a signal quality of the received transmissions,
    a feedback-type associated with the received plurality of transmissions, or
    a combination thereof.

5. The method of claim 3, wherein identifying the at least one of the plurality of transmissions comprises identifying that the at least one of the plurality of transmissions is received before a time-domain resource.

6. The method of claim 3, wherein identifying the at least one of the plurality of transmissions comprises identifying that the at least one of the plurality of transmissions has a lowest priority compared to priorities of other received transmissions of the plurality of transmissions.

7. The method of claim 3, wherein identifying the at least one of the plurality of transmissions comprises identifying that at least one of the one or more second UEs, which transmitted the at least one of the plurality of transmissions, is farthest from the first UE compared to other of the one or more second UEs.

8. The method of claim 3, wherein identifying the at least one of the plurality of transmissions comprises identifying that the at least one of the plurality of transmissions has a weakest signal quality compared to a signal quality of other received transmissions of the plurality of transmissions.

9. The method of claim 3, wherein identifying the at least one of the plurality of transmissions comprises identifying that the at least one of the plurality of transmissions has an acknowledge-based feedback type.

10. The method of claim 1, wherein dropping the at least one of the plurality of transmissions or the one or more TBs from being processed comprises:
    identifying all of the at least one of the plurality of transmissions that satisfy one of the one or more rules; and
    dropping all of the at least one of the plurality of transmissions or the one or more TBs associated with all of the at least one of the plurality of transmissions from being processed based on the identification.

11. The method of claim 1, wherein dropping the at least one of the plurality of transmissions or the one or more TBs from being processed comprises:
    identifying a first set of the plurality of transmissions that satisfy a first rule of the one or more rules;
    after identifying the first set of the plurality of transmissions, identifying a second set of the first set of the plurality of transmissions that satisfy a second rule of the one or more rules; and
    dropping the second set of the first set of the plurality of transmissions or the one or more TBs associated with the second set of the first set of the plurality of transmissions from being processed.

12. The method of claim 1, further comprising receiving the plurality of transmissions from the one or more second UEs via a sidelink channel.

13. The method of claim 1, wherein processing the one or more remaining transmissions comprises decoding the one or more remaining transmissions.

14. The method of claim 1, wherein taking one or more actions based on the processed one or more remaining transmissions comprises forwarding the one or more remaining transmissions to at least one of a base station or a third UE.

15. The method of claim 1, wherein taking one or more actions based on the processed one or more remaining transmissions comprises sending at least one of an acknowledgement (ACK) message or a negative acknowledgment (NACK) message to the one or more second UEs or a base station.

16. A method of wireless communication by a first user equipment (UE), comprising:
dropping, in response to a hybrid automatic repeat request (HARQ) budget that is exceeded relative to a number of active HARQ processes, according to one or more rules, at least one of a plurality of transmissions to one or more second UEs or one or more transport blocks (TBs) associated with the at least one of the plurality of transmissions from being transmitted, wherein the one or more rules are based at least in part on whether the at least one of the plurality of transmissions is transmitted outside a window of one or more time-domain resources associated with the plurality of transmissions; and
transmitting one or more remaining transmissions of the plurality of transmissions to the one or more second UEs.

17. The method of claim 16, wherein dropping the at least one of the plurality of transmissions or the one or more TBs from being transmitted comprises determining that at least one of a number of the plurality of transmissions, a number of time-domain resources associated with the plurality of transmissions, a soft buffer capacity is equal to or greater than one or more thresholds, or a combination thereof.

18. The method of claim 16, wherein dropping the at least one of the plurality of transmissions or the one or more TBs from being transmitted comprises:
identifying the at least one of the plurality of transmissions that satisfies the one or more rules; and
dropping the at least one of the plurality of transmissions or the one or more TBs from being transmitted based on the identification.

19. The method of claim 18, wherein the one or more rules are further based on at least one of:
a priority level associated with the plurality of transmissions,
a delay budget associated with the plurality of transmissions,
a number of remaining retransmissions,
a distance between the first UE and the one or more second UEs,
a feedback-type associated with the plurality of transmissions, or
a combination thereof.

20. The method of claim 18, wherein identifying the at least one of the plurality of transmissions comprises identifying that the at least one of the plurality of transmissions is to be transmitted before a time-domain resource.

21. The method of claim 18, wherein identifying the at least one of the plurality of transmissions comprises identifying that the at least one of the plurality of transmissions has a lowest priority compared to priorities of other transmissions.

22. The method of claim 18, wherein identifying the at least one of the plurality of transmissions comprises identifying that the at least one of the plurality of transmissions has a least amount of time remaining in a packet delay budget compared to delay budgets of other transmissions.

23. The method of claim 18, wherein identifying the at least one of the plurality of transmissions comprises identifying that the at least one of the plurality of transmissions has a greatest amount of time remaining in a packet delay budget compared to delay budgets of other transmissions.

24. The method of claim 18, wherein identifying the at least one of the plurality of transmissions comprises identifying that at least one of the one or more second UEs is farthest from the first UE compared to other of the one or more second UEs.

25. The method of claim 18, wherein identifying the at least one of the plurality of transmissions comprises identifying that the at least one of the plurality of transmissions has an acknowledge-based feedback type.

26. The method of claim 16, wherein dropping the at least one of the plurality of transmissions or the one or more TBs from being transmitted comprises:
identifying all of the at least one of the plurality of transmissions that satisfy one of the one or more rules; and
dropping all of the at least one of the plurality of transmissions or the one or more TBs associated with all of the at least one of the plurality of transmissions from being transmitted based on the identification.

27. The method of claim 16, wherein dropping the at least one of the plurality of transmissions or the one or more TBs from being transmitted comprises:
identifying a first set of the plurality of transmissions that satisfy a first rule of the one or more rules;
after identifying the first set of the plurality of transmissions, identifying a second set of the first set of the plurality of transmissions that satisfy a second rule of the one or more rules; and
dropping the second set of the first set of the plurality of transmissions or the one or more TBs associated with the second set of the first set of the plurality of transmissions from being transmitted.

28. The method of claim 16, further comprising:
transmitting at least one of an acknowledgement (ACK) message or a negative acknowledgment (NACK) message, based on the at least one of the plurality of transmissions or the remaining transmissions, to a base station; and
wherein the one or more remaining transmissions are transmitted via a sidelink channel to the one or more second UEs.

29. An apparatus for wireless communication, comprising:
a memory; and
a processor coupled to the memory, the processor configured to:
drop, in response to a hybrid automatic repeat request (HARQ) budget that is exceeded relative to a number of active HARQ processes, according to one or more rules, at least one of a plurality of transmissions received from one or more user equipment (UEs) or one or more transport blocks (TBs) associated with the at least one of the plurality of transmissions from being processed, wherein the one or more rules are based at least in part on whether the at least one of the plurality of transmissions is received outside a window of one or more time-domain resources associated with the received plurality of transmissions,
process one or more remaining transmissions of the plurality of the transmissions, and
take one or more actions based on the processed one or more remaining transmissions.

30. The apparatus of claim 29, wherein to drop the at least one of the plurality transmissions or the one or more TBs from being processed, the processor is further configured to:
identify the at least one of the plurality of transmissions that satisfies the one or more rules; and
drop the at least one of the plurality of transmissions or the one or more TBs from being processed based on the identification.

31. The apparatus of claim 30, wherein the one or more rules are further based on at least one of:
a priority level associated with the received plurality of transmissions,
a number of remaining retransmissions,
a distance between the apparatus and the one or more UEs,
a signal quality of the received transmissions,
a feedback-type associated with the received plurality of transmissions, or
a combination thereof.

32. The apparatus of claim 31, wherein to drop the at least one of the plurality of transmissions or the one or more TBs from being transmitted, the processor is further configured to:
identify the at least one of the plurality of transmissions that satisfies the one or more rules; and
drop the at least one of the plurality of transmissions or the one or more TBs from being transmitted based on the identification.

33. The apparatus of claim 32, wherein the one or more rules are further based on at least one of:
a priority level associated with the plurality of transmissions,
a delay budget associated with the plurality of transmissions,
a number of remaining retransmissions,
a distance between the apparatus and the one or more UEs,
a feedback-type associated with the plurality of transmissions, or
a combination thereof.

34. An apparatus for wireless communication, comprising:
a memory;
a processor coupled to the memory, the processor configured to:
drop, in response to a hybrid automatic repeat request (HARQ) budget that is exceeded relative to a number of active HARQ processes, according to one or more rules, at least one of a plurality of transmissions to one or more user equipment (UEs) or one or more transport blocks (TBs) associated with the at least one of the plurality of transmissions from being processed, wherein the one or more rules are based at least in part on whether the at least one of the plurality of transmissions is transmitted outside a window of one or more time-domain resources associated with the plurality of transmissions; and
a transmitter configured to transmit one or more remaining transmissions of the plurality of transmissions to the one or more UEs.

35. A non-transitory computer-readable medium storing code that, when executed by one or more processors of an apparatus, cause the apparatus to:
drop, in response to a hybrid automatic repeat request (HARQ) budget that is exceeded relative to a number of active HARQ processes, according to one or more rules, at least one of a plurality of transmissions received from one or more user equipment (UEs) or one or more transport blocks (TBs) associated with the at least one of the plurality of transmissions from being processed, wherein the one or more rules are based at least in part on whether the at least one of the plurality of transmissions is received outside a window of one or more time-domain resources associated with the received plurality of transmissions;
process one or more remaining transmissions of the plurality of transmissions; and
take one or more actions based on the processed one or more remaining transmissions.

36. The non-transitory computer-readable medium of claim 35, wherein to drop the at least one of the plurality transmissions or the one or more TBs from being processed, the computer-readable medium further stores the code that, when executed by the one or more processors of the apparatus, cause the apparatus to:
identify the at least one of the plurality of transmissions that satisfies the one or more rules; and
drop the at least one of the plurality of transmissions or the one or more TBs from being processed based on the identification.

37. The non-transitory computer-readable medium of claim 36, wherein the one or more rules are further based on at least one of:
a priority level associated with the received plurality of transmissions,
a number of remaining retransmissions,
a distance between the apparatus and the one or more UEs,
a signal quality of the received transmissions,
a feedback-type associated with the received plurality of transmissions, or
a combination thereof.

38. A non-transitory computer-readable medium storing code that, when executed by one or more processors of an apparatus, cause the apparatus to:
drop, in response to a hybrid automatic repeat request (HARQ) budget that is exceeded relative to a number of active HARQ processes, according to one or more rules, at least one of a plurality of transmissions to one or more user equipment (UEs) or one or more transport blocks (TBs) associated with the at least one of the plurality of transmissions from being transmitted, wherein the one or more rules are based at least in part on whether the at least one of the plurality of transmissions is transmitted outside a window of one or more time-domain resources associated with the plurality of transmissions; and
transmit one or more remaining transmissions of the plurality of transmissions to the one or more UEs.

39. The non-transitory computer-readable medium of claim 38, wherein to drop the at least one of the plurality of transmissions or the one or more TBs from being transmitted, the computer-readable medium further stores the code that, when executed by the one or more processors of the apparatus, cause the apparatus to:
identify the at least one of the plurality of transmissions that satisfies the one or more rules; and
drop the at least one of the plurality of transmissions or the one or more TBs from being transmitted based on the identification.

40. The non-transitory computer-readable medium of claim 39, wherein the one or more rules are further based on at least one of:
a priority level associated with the plurality of transmissions,
a delay budget associated with the plurality of transmissions,
a number of remaining retransmissions,
a distance between the apparatus and the one or more UEs,
a feedback-type associated with the plurality of transmissions, or
a combination thereof.

* * * * *